(12) United States Patent
Tsai

(10) Patent No.: US 7,237,364 B2
(45) Date of Patent: Jul. 3, 2007

(54) FOUNDATION SHOCK ELIMINATOR

(76) Inventor: Chong-Shien Tsai, 6F-2, No. 5, Lane 466, Minchuan Rd., North Dist., Taichung (TW)

(*) Notice: Subject to any disclaimer, the term of this patent is extended or adjusted under 35 U.S.C. 154(b) by 319 days.

(21) Appl. No.: 10/882,211

(22) Filed: Jul. 2, 2004

(65) Prior Publication Data
US 2006/0000159 A1  Jan. 5, 2006

(51) Int. Cl.
E04H 9/02 (2006.01)
(52) U.S. Cl. ............... 52/167.6; 52/167.4; 248/638
(58) Field of Classification Search ............ 52/167.4, 52/167.5, 167.6, 167.7, 167.8, 167.1, 167.9; 248/638, 636; 702/15
See application file for complete search history.

(56) References Cited

U.S. PATENT DOCUMENTS 4,320,549 A * 3/1982 Greb .................. 14/73.5
4,887,788 A * 12/1989 Fischer et al. .......... 248/562
6,085,473 A * 7/2000 Teramachi et al. ...... 52/167.5
6,164,022 A * 12/2000 Ishikawa et al. ........ 52/167.5
6,321,492 B1 * 11/2001 Robinson .............. 52/167.1
6,385,917 B1 * 5/2002 Konomoto ............. 52/167.6
6,725,612 B2 * 4/2004 Kim ..................... 52/167.5

* cited by examiner

Primary Examiner—Lanna Mai
Assistant Examiner—Christine T Cajilig
(74) Attorney, Agent, or Firm—Bacon & Thomas, PLLC

(57) ABSTRACT

A foundation shock eliminator includes an upper block, a lower stationary base, an interconnecting assembly and an energy damping coating. The lower stationary base is mounted under the upper block. The interconnecting assembly is mounted between the upper block and the lower stationary base and includes an upper track, a lower track and a track joint. The upper and the lower tracks are respectively attached to the upper block and the lower stationary base and are arranged in a cross. The track joint is slidably mounted between the tracks. The energy damping coating mounted in the foundation shock eliminator absorbs shock energy. Consequently, the upper block will move relative to the lower stationary base to counterbalance the most horizontal shock effects and cooperates with the energy damping coating absorbing the shock energy in both horizontal and vertical directions so that reduction of shock is efficient.

13 Claims, 6 Drawing Sheets

FOUNDATION SHOCK ELIMINATOR

BACKGROUND OF THE INVENTION

1. Field of the Invention

The present invention relates to a foundation shock eliminator, and more particularly to a foundation shock eliminator that will dissipate and absorb efficiently both vertical and horizontal shocks to a structure or a machine.

2. Description of Related Art

Vibration control and shock reduction are fundamental concerns in the construction of structures, machines and industrial manufacturing instruments. This can concern vibration and shocks from seismic events or even low intensity events such as subway trains passing below structures. Although the subway train shocks are relatively predictable in their direction, intensity and even timing, the same is not true for earthquakes that can vary enormously, thereby providing particular difficulty to civil engineers. Diminishing the effect of shocks on objects is achieved primarily by isolating the shocks or absorbing the shocks.

Shocks, such as seismic shocks or low intensity shocks will influence adversely qualities of high precision electronic products during the fabrication of the electronic products. Therefore, reduction of the effects of shock transmitted to the high precision manufacturing machines in electronic industries is always an important concern.

A conventional foundation shock eliminator in accordance with prior art is generally mounted between the rigid foundation and structures or the floor and machines. The conventional foundation shock eliminator is made of steel and comprises an upper block, a lower stationary base and a roller.

The upper block and the lower stationary base may be rectangular, square, round or polygonal and have respectively concave inner surfaces. The lower stationary base is fastened to the rigid foundation such as ground or the floor by fasteners such as bolts. The upper block supports the bottom of the structure or machines, is supported by the roller and is movable relative to the lower stationary base. The concave inner surfaces of the upper block and the lower stationary base face each other.

The roller can be a rolling ball and is mounted between the two concave inner surfaces, whereby the ball rolls on the concave inner surface of the lower stationary base and supports the concave inner surface of the upper block.

Consequently, the conventional foundation shock eliminator will reduce the effect of shocks, such as from earthquakes, transmitted to the structures or machines when the ground or floor undergoes shocks with the relative movements of the upper block.

However, the conventional foundation shock eliminator cannot completely diminish the effect of shocks transmitted via the ground or the floor enough to keep the structures from collapsing or the machines from being influenced adversely by the shocks. Since the roller of the conventional foundation shock eliminator only reduces the horizontal component of shocks and does nothing to reduce the vertical component of shocks, the applications and usage of the conventional foundation shock eliminators are restricted.

To overcome the shortcomings, the present invention provides an improved foundation shock eliminator to mitigate or obviate the aforementioned problems.

SUMMARY OF THE INVENTION

The main objective of the invention is to provide a foundation shock eliminator that will efficiently dissipate both vertical and horizontal components of shocks to reduce the effect of shocks on machines and structures when the machines or structures undergo the shocks.

A foundation shock eliminator in accordance with the present invention includes an upper block, a lower stationary base, an interconnecting assembly and an energy damping coating. The lower stationary base is mounted under the upper block. The interconnecting assembly is mounted between the upper block and the lower stationary base and includes an upper track, a lower track and a track joint. The upper and the lower tracks are respectively attached to the upper block and the lower stationary base and are arranged in an intersecting manner across the upper track. The track joint is slidably mounted between the upper track and the lower track. The energy damping coating is mounted on at least one of the upper block, the lower stationary base and the interconnecting assembly. Consequently, the upper block will move relative to the lower stationary base to counterbalance most horizontal shock effects, and the energy damping coating will absorb shock energy to cushion the structures or machines mounted on the foundation shock eliminator. The foundation shock eliminator will arrest a path of shock transmission at both horizontal and vertical directions to prevent efficiently the structures or machines mounted on the foundation shock eliminator from collapsing or being excessively shaken.

Other objectives, advantages and novel features of the invention will become more apparent from the following detailed description when taken in conjunction with the accompanying drawings.

DETAILED DESCRIPTION OF PREFERRED EMBODIMENT

Figure 1:
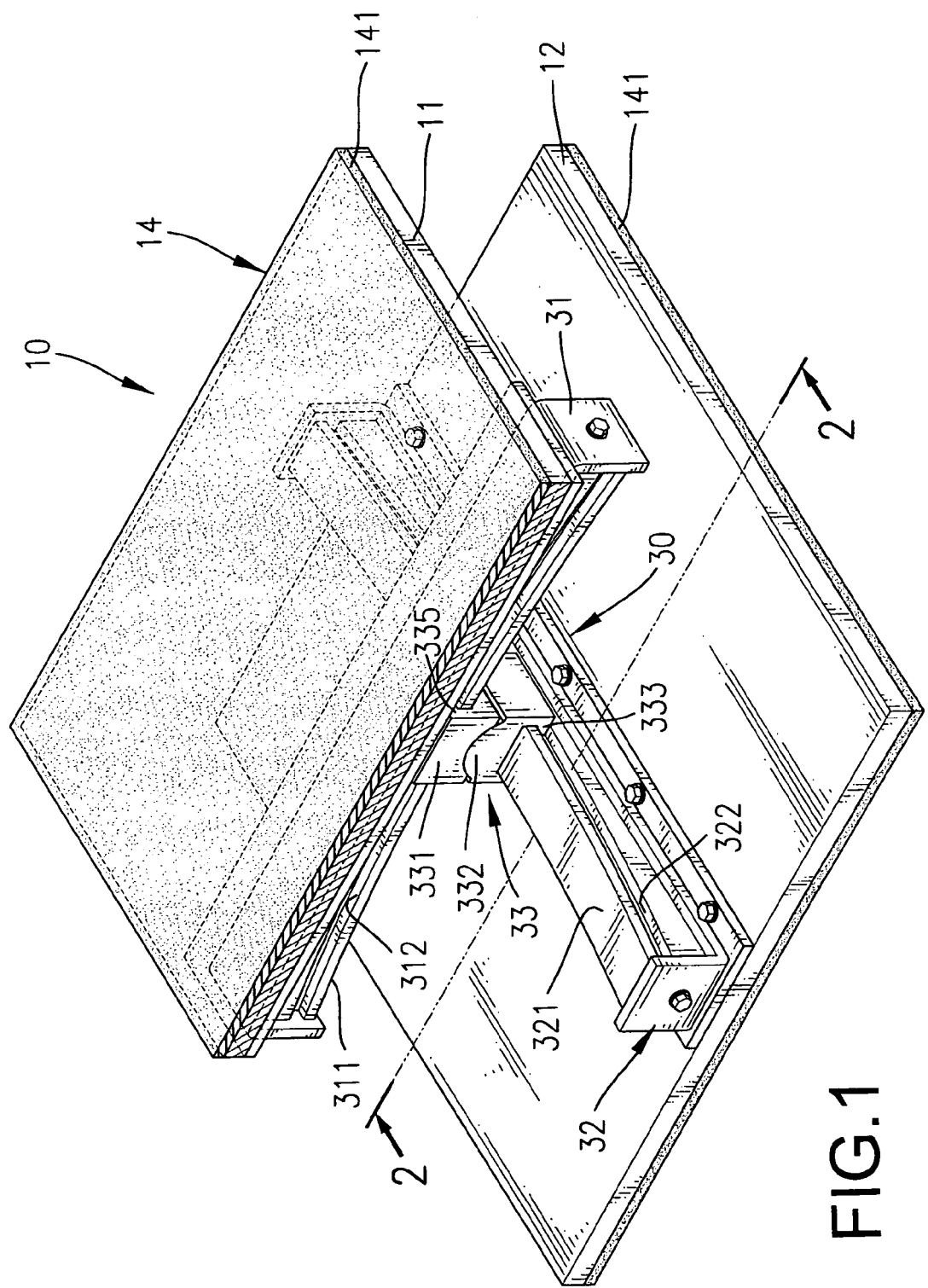
FIG. 1 is a perspective view in partial section of a foundation shock eliminator in accordance with the present invention.
Figure 2:
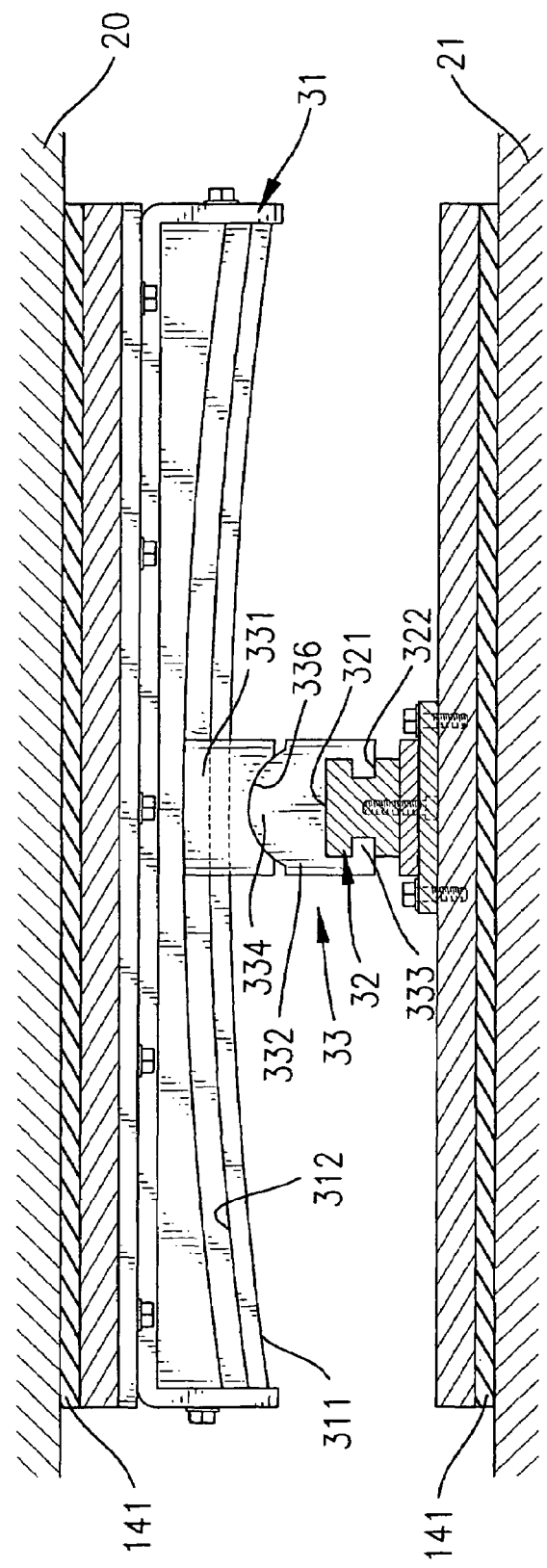
FIG. 2 is an operational side elevational view in partial section of the foundation shock eliminator in FIG. 1 when the foundation shock eliminator is mounted between a rigid foundation and a structure.

With reference to FIGS. 1 and 2, a foundation shock eliminator (10) in accordance with the present invention can be used to diminish shock transmitted to structures or manufacturing machines in electronics factories, such as wafer manufacturing factories. The foundation shock eliminator (10) comprises an upper block (11), a lower stationary base (12), an interconnecting assembly (30) and an energy damping coating (14). The interconnecting assembly (30) is mounted between the upper block (11) and the lower stationary base (12). The energy damping coating (14) is selectively mounted on at least one of the upper block (11), the lower stationary base (12) and the interconnecting assembly (30).

The upper block (11) is a planar block that supports a basis (20) of a structure or a machine and has a top surface and a bottom surface. The top surface supports the basis (20) of the structure.

The lower stationary base (12) with a top surface and a bottom surface is attached to a rigid foundation (21) such as the ground or a floor and arranged underlying the upper block (11). The top surface of the lower stationary base (12) faces the bottom surface of the upper block (11).

The interconnecting assembly (30) comprises an upper track (31), a lower track (32) and a track joint (33). The upper track (31) is laterally attached to the bottom surface of the upper block (11). The lower track (32) is attached to the top surface of the lower stationary base (12) and is arranged in an intersecting manner across the upper track (31). The two tracks (31, 32) are respectively arranged along an X-coordinate and a Y-coordinate so that an arrangement of the two tracks (31, 32) resembles a cross.

The upper track (31) has an upper concave surface (311) and two upper guiding grooves (312). The upper guiding grooves (312) are defined alongside the upper concave surface (311).

The lower track (32) has a lower concave surface (321) and two lower guiding grooves (322). The lower guiding grooves (322) are defined alongside the lower concave surface (321).

The track joint (33) is slidably mounted between the upper track (31) and the lower track (32) and comprises an upper sliding block (331) and a lower sliding block (332).

The upper sliding block (331) is slidably mounted on the upper track (31) and slides along the upper concave surface (311). The upper sliding block (331) has a top, a bottom, two upper hooks (335) and an upper contacting surface (336). The upper hooks (335) are formed at the top of the upper sliding block (331) and are respectively and slidably held in the upper guiding grooves (312) in the upper track (31). The upper contacting surface (336) is a concave surface and is defined in the bottom of the upper sliding block (331).

The lower sliding block (332) is slidably mounted on the lower track (32) and slides along the lower concave surface (321). The lower sliding block (332) has a top, a bottom, two lower hooks (333) and a lower contacting surface (334). The lower hooks (333) are formed at the bottom of the lower sliding block (332) and are respectively and slidably held in the lower guiding grooves (322) in the lower track (32). The lower contacting surface (334) with a convex surface is formed at the top of the lower sliding block (332) and is rotatably held in the concave upper contacting surface (336) in the upper sliding block (331).

The energy damping coating (14) is made of damping materials, such as rubber, viscoselastic materials or frictional materials and introduces damping characteristics to the entire foundation shock eliminator (10) to absorb shock energy, especially for vertical transmission path of shocks. Due to the reduction in the energy, the response, such as the displacement of the foundation shock eliminator (10) decreases. The energy damping coating (14) comprises two surface coatings (141). The surface coatings (141) are respectively spread on the top surface of the upper block (11) and the bottom surface of the lower stationary base (12). Otherwise, the surface coatings (141) can be spread respectively on the concave surfaces (311, 321) of the tracks (31, 32).

The foundation shock eliminator (10) insulates a path of shock transmission from the rigid foundation (21) to the basis (20) of the structures or the machines to prevent the structures or the machines from shock effects. When the shocks are transmitted through the foundation shock eliminator (10), the upper block (11) is horizontally moved relative to the lower stationary base (12) along the tracks (31, 32) to eliminate horizontal components of shocks to keep the structures or the machines supported by the upper block (11) from being damaged or disturbed by the shocks. Since the convex lower contacting surface (334) of the lower sliding block (332) is rotatably contacted with the concave upper contacting surface (336) of the upper sliding block (331), the track joint (33) will further eliminate arbitrary directions of shocks transmitted via the foundation shock eliminator (10) and keep the supported structures or machines from tilting in the vertical directions.

Simultaneously, cooperating with the energy damping coating (14) that absorbs shock energy, the foundation shock eliminator (10) will efficiently dissipate and absorb the shock energy in both horizontal and vertical directions and diminish the effects of shocks to the structures or the machines.

Figure 3:
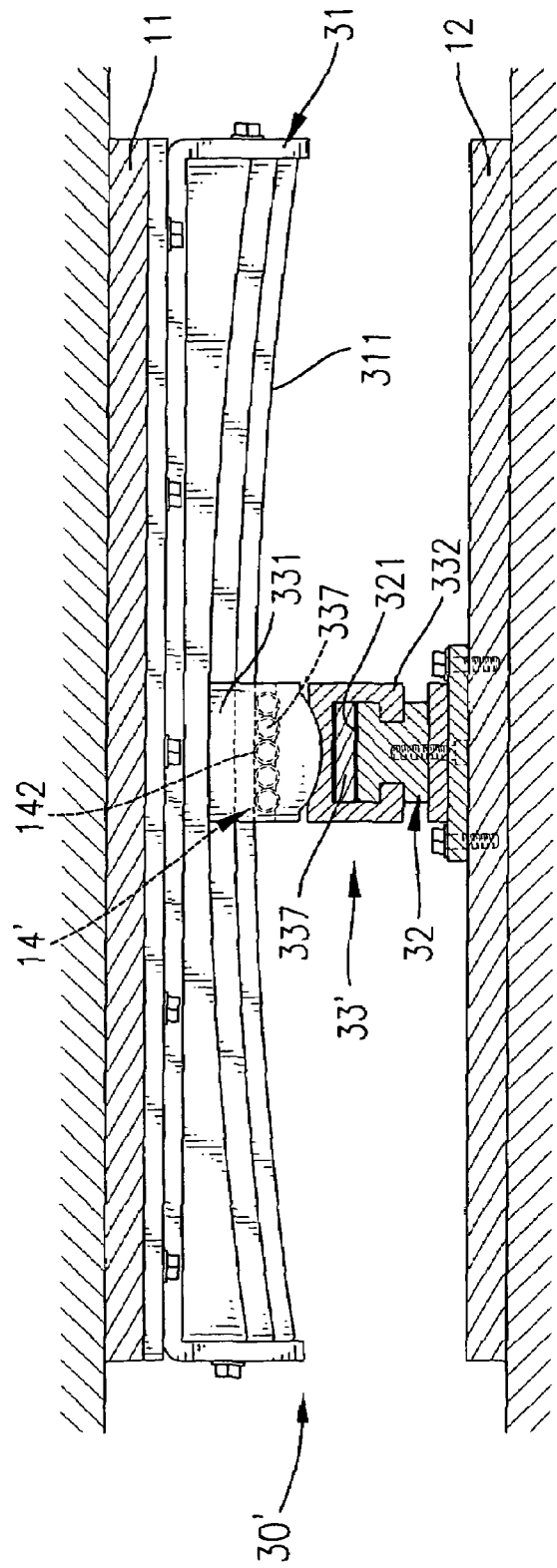
FIG. 3 is an operational side elevational view in partial section of a second embodiment of a foundation shock eliminator in accordance with the present invention.

With reference to FIG. 3, a second embodiment of a foundation shock eliminator in accordance with the present invention comprises an upper block (11), a lower stationary base (12), an interconnecting assembly (30') and an energy damping coating (14').

The interconnecting assembly (30') comprises an upper track (31), a lower track (32) and a track joint (33'). The upper track (31) and the lower track (32) are arranged as previously described.

The track joint (33') is slidably mounted between the upper track (31) and the lower track (32) and comprises an upper sliding block (331), a lower sliding block (332) and multiple first rollers (337).

The upper sliding block (331) and the lower sliding block (332) are configured as previously described. The upper track (31) has an upper concave surface (311). The lower track (32) has a lower concave surface (321). The first rollers (337) are respectively mounted between the upper concave surface (311) and the upper sliding block (331), and the lower concave surface (321) and the lower sliding block (332) to contribute easy sliding movements of the track joint (33').

The first rollers (337) roll respectively along the upper and the lower concave surfaces (311, 321) and can be cylinders or balls. When the cylinders are the first rollers (337), the energy damping coating (14') comprises multiple roller coatings (142). The roller coatings (142) cover respectively around the cylindrical first rollers (337) to absorb shock energy.

Figure 4:
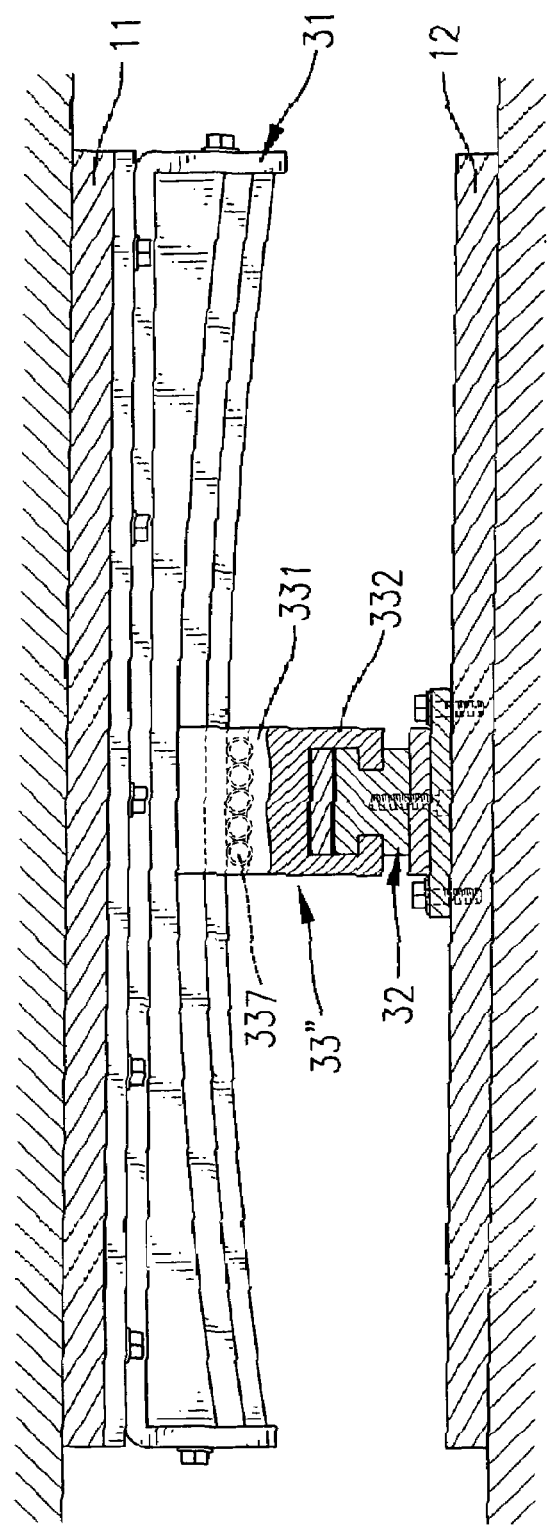
FIG. 4 is an operational side elevational view in partial section of a third embodiment of a foundation shock eliminator in accordance with the present invention.

With reference to FIG. 4, a third embodiment of the present invention is a modification of the second embodiment and the modification is implemented with a track joint (33"). The track joint (33") is slidably mounted between the upper track (31) and the lower track (32) and comprises an upper sliding block (331), a lower sliding block (332) and multiple first rollers (337). The upper and the lower sliding blocks (331, 332) are united integrally together.

Figure 5:
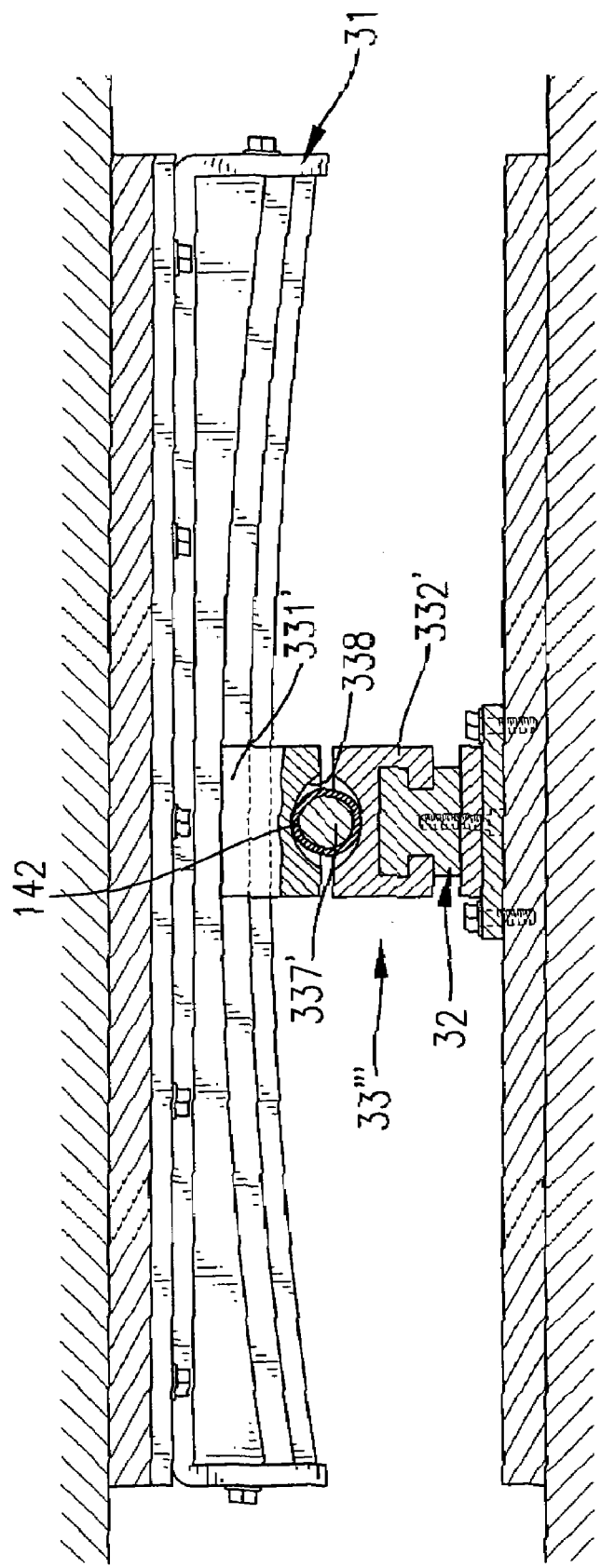
FIG. 5 is an operational side elevational view in partial section of a fourth embodiment of a foundation shock eliminator in accordance with the present invention.

With reference to FIGS. 2 and 5, a fourth embodiment of the present invention is a modification of the first embodiment and the modification is implemented with a track joint (33'''). The track joint (33''') comprises an upper sliding block (331'), a lower sliding block (332') and a second roller (337').

Each of the upper sliding block (331') and the lower sliding block (332') has a concave recess (338). The concave recesses (338) face and are aligned with each other.

The second roller (337') is rotatably mounted between and is held in the concave recesses (338) and is a ball. The roller coating (142) covers around the second roller (337) as the energy damping coating (14) of the first embodiment.

Figure 6:
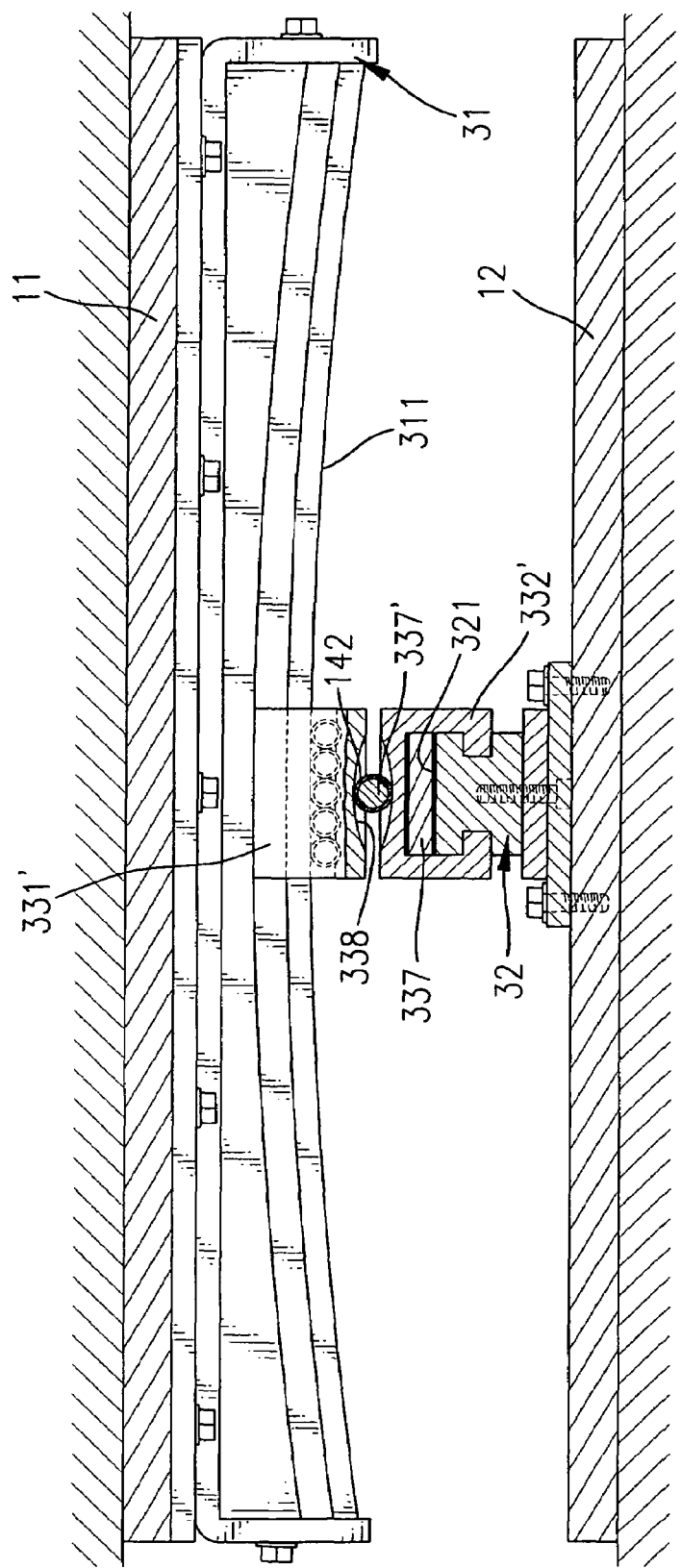
FIG. 6 is an operational side elevational view in partial section of a fifth embodiment of a foundation shock eliminator in accordance with the present invention.

With reference to FIG. 6, a fifth embodiment of the present invention modifies the fourth embodiment and further comprises multiple first rollers (337). The first rollers (337) roll respectively along the upper and the lower concave surfaces (311, 321) and can be cylinders or balls.

Consequently, when the shocks that are transmitted through the foundation shock eliminator (10) will be diminished, the upper block (11) moves relative to the lower stationary base (12) to counterbalance most horizontal shock effects because of relative motions between the tracks (31, 32) and the track joint (33, 33', 33'', 33'''). In addition, the energy damping coating (14) will absorb the shock energy to cushion the structures or machines mounted on the foundation shock eliminator (10) and keeps the structures or machines from most vertical shocks. The foundation shock eliminator (10) in accordance with the present invention will stop the path of shock transmission at both horizontal and vertical directions to prevent efficiently the structures or machines mounted on the foundation shock eliminator (10) from collapsing or being shaken.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. A foundation shock eliminator comprising:
    an upper block having a top surface and a bottom surface;
    a lower stationary base mounted under the upper block and having a top surface and a bottom surface; and
    an interconnecting assembly mounted between the upper block and the lower stationary base and comprising
    an upper track having an upper concave surface attached to the bottom surface of the upper block;
    a lower track having a lower concave surface attached to the top surface of the lower stationary base and arranged in an intersecting manner across the upper concave surface of the upper track; and
    a track joint slidably mounted between the upper track and the lower tracks and having:
    an upper sliding block slidably mounted on the upper track along the upper concave surface of the upper track and having a top, a bottom and an upper contacting surface defined in the bottom of the upper sliding block; and
    a lower sliding block slidably mounted on the lower track along the lower concave surface of the lower track and having a top, a bottom and a lower contacting surface defined in the top of the lower sliding block and rotatably contacted with the upper contacting surface in the upper sliding block.

2. The foundation shock eliminator as claimed in claim 1, further comprising an energy damping coating mounted on at least one of the upper block, the lower stationary base and the interconnecting assembly.

3. The foundation shock eliminator as claimed in claim 2, wherein the energy damping coating comprises first and second surface coatings, the first surface coating covering the top surface of the upper block and the second surface coating covering the bottom surface of the lower stationary base.

4. The foundation shock eliminator as claimed in claim 2, wherein
    the upper track has two upper guiding grooves defined alongside the upper concave surface;
    the lower track has two lower guiding grooves defined alongside the lower concave surface;
    the upper sliding block has two upper hooks formed at the top of the upper sliding block and respectively and slidably held in the upper guiding grooves in the upper track; and
    the lower sliding block has two lower hooks formed at the bottom of the lower sliding block and respectively and slidably held in the lower guiding grooves in the lower track;
    wherein the bottom of the upper sliding block is mounted on the top of the lower sliding block.

5. The foundation shock eliminator as claimed in claim 4, wherein the energy damping coating comprises a surface coating covering on the upper concave surface of the upper track and a surface coating covering on the lower concave surface of the lower track.

6. The foundation shock eliminator as claimed in claim 4, wherein the track joint further comprises multiple first rollers respectively mounted between the upper concave surface and the upper sliding block, and the lower concave surface and the lower sliding block.

7. The foundation shock eliminator as claimed in claim 6, wherein the first rollers are cylinders.

8. The foundation shock eliminator as claimed in claim 6, wherein the first rollers are balls.

9. The foundation shock eliminator as claimed in claim 6, wherein the energy damping coating comprises multiple roller coatings covering respectively around the first rollers.

10. The foundation shock eliminator as claimed in claim 1, wherein
    the upper track has two upper guiding grooves defined alongside the upper concave surface;
    the lower track has two lower guiding grooves defined alongside the lower concave surface;
    the upper sliding block has two upper hooks formed at the top of the upper sliding block and respectively and slidably held in the upper guiding grooves in the upper track; and
    the lower sliding block has two lower hooks formed at the bottom of the lower sliding block and respectively and slidably held in the lower guiding grooves in the lower track;
    wherein the bottom of the upper sliding block is mounted on the top of the lower sliding block.

11. The foundation shock eliminator as claimed in claim 10, wherein the track joint further comprises multiple first rollers respectively mounted between the upper concave surface and the upper sliding block, and the lower concave surface and the lower sliding block.

12. The foundation shock eliminator as claimed in claim 11, wherein the first rollers are cylinders.

13. The foundation shock eliminator as claimed in claim 11, wherein the first rollers are balls.

* * * * *